US012649253B2

(12) United States Patent
Kumar

(10) Patent No.: US 12,649,253 B2
(45) Date of Patent: Jun. 9, 2026

(54) MANUFACTURE OF A LEADING-EDGE PROTECTION ELEMENT BY TRIMMING

(71) Applicant: LM WIND POWER A/S, Kolding (DK)

(72) Inventor: Pawan Kumar, Nelamangala Taluk (IN)

(73) Assignee: LM WIND POWER A/S, Kolding (DK)

( * ) Notice: Subject to any disclaimer, the term of this patent is extended or adjusted under 35 U.S.C. 154(b) by 163 days.

(21) Appl. No.: 18/564,381

(22) PCT Filed: Jun. 20, 2022

(86) PCT No.: PCT/EP2022/066696
§ 371 (c)(1),
(2) Date: Nov. 27, 2023

(87) PCT Pub. No.: WO2022/268694
PCT Pub. Date: Dec. 29, 2022

(65) Prior Publication Data
US 2024/0246252 A1 Jul. 25, 2024

(30) Foreign Application Priority Data

Jun. 23, 2021 (EP) .................................... 21181210

(51) Int. Cl.
B26D 1/157 (2006.01)
F03D 1/06 (2006.01)

(52) U.S. Cl.
CPC ........... B26D 1/157 (2013.01); F03D 1/0688 (2023.08); *B26D 2210/00* (2013.01); *F05B 2230/10* (2013.01); *F05B 2240/303* (2020.08)

(58) Field of Classification Search
CPC ... B26D 1/157; B26D 2210/00; F03D 1/0688; F05B 2240/303; F05B 2230/10
(Continued)

(56) References Cited

U.S. PATENT DOCUMENTS 3,791,246 A * 2/1974 Lazickas ............... B26F 1/3826
                                                                     83/939
4,552,192 A * 11/1985 Eaves ................... B23D 45/16
                                                                      30/375
(Continued)

FOREIGN PATENT DOCUMENTS

WO 2018166664 A1 9/2018

*Primary Examiner* — Omar Flores Sanchez
(74) *Attorney, Agent, or Firm* — Nath, Goldberg & Meyer; Tanya E. Harkins

(57) ABSTRACT

The present invention provides a method for trimming a side portion of a pre-manufactured leading-edge protection element for a wind turbine blade. The element comprises a first side portion and a second side portion, the first side portion, when mounted to the wind turbine blade, extending from the leading edge and along a part of a pressure side of the wind turbine blade, and the second side portion, when mounted to the wind turbine blade, extending from the leading edge and along a part of a suction side of the wind turbine blade, or vice versa. The method comprises steps of: providing a support structure and a first cutting tool; arranging element on the support structure and fixating the element to the support structure, and cutting along a predetermined cutting path, whereby the leading-edge protection element is trimmed to a predetermined length. A corresponding system is also provided.

17 Claims, 7 Drawing Sheets

(58) Field of Classification Search
USPC ................................................ 30/371; 83/375
See application file for complete search history.

(56)                    References Cited

U.S. PATENT DOCUMENTS

| | | | | |
|---|---|---|---|---|
| 4,637,288 | A * | 1/1987 | Olsen | F16P 3/20 |
| | | | | 83/DIG. 1 |
| 5,791,222 | A * | 8/1998 | Micouleau | E04D 13/064 |
| | | | | 269/235 |
| 5,825,652 | A * | 10/1998 | LeBlond | B26F 1/3813 |
| | | | | 81/463 |
| 6,079,306 | A * | 6/2000 | Liu | B26D 7/01 |
| | | | | 83/167 |
| 7,918,150 | B2 * | 4/2011 | Marocco | E06B 9/266 |
| | | | | 83/555 |
| 8,122,803 | B2 * | 2/2012 | Abe | B23D 47/04 |
| | | | | 269/45 |
| 8,549,970 | B2 * | 10/2013 | Stone | B27B 27/08 |
| | | | | 83/490 |
| 11,143,163 | B2 * | 10/2021 | Juarez | F03D 9/25 |
| 11,220,998 | B2 * | 1/2022 | Fujioka | H02K 7/183 |
| 11,274,653 | B2 * | 3/2022 | Kratmann | F03D 80/00 |
| 11,408,393 | B2 * | 8/2022 | Koops Kratmann | |
| | | | | F03D 1/0675 |
| 12,215,667 | B2 * | 2/2025 | Seruntine | F03D 1/0675 |
| 2005/0011077 | A1 * | 1/2005 | Ballard | B23D 47/02 |
| | | | | 30/286 |
| 2015/0313097 | A1 * | 11/2015 | LaTendresse | B23D 45/006 |
| | | | | 83/13 |
| 2018/0223794 | A1 * | 8/2018 | Tobin | B29D 99/0028 |
| 2018/0370055 | A1 * | 12/2018 | Völkl | A22C 17/002 |
| 2019/0277247 | A1 | 9/2019 | Kratmann et al. | |
| 2021/0062784 | A1 * | 3/2021 | Tangager | F03D 13/10 |
| 2021/0262350 | A1 * | 8/2021 | Mathew | F03D 80/30 |
| 2021/0262434 | A1 * | 8/2021 | Okano | F03D 80/301 |
| 2021/0262449 | A1 * | 8/2021 | March Nomen | B29D 99/0025 |
| 2023/0265828 | A1 * | 8/2023 | Mukherjee | F03D 1/0688 |
| | | | | 416/241 R |
| 2024/0068438 | A1 * | 2/2024 | Mukherjee | F03D 1/0688 |
| 2024/0159214 | A1 * | 5/2024 | Hancock | F03D 1/0688 |
| 2024/0254961 | A1 * | 8/2024 | Haag | F03D 1/0688 |
| 2025/0114817 | A1 * | 4/2025 | Hasseriis | F03D 1/0688 |

* cited by examiner

1

MANUFACTURE OF A LEADING-EDGE PROTECTION ELEMENT BY TRIMMING

This is a National Phase Application filed under 35 U.S.C. 371 as a national stage of PCT/EP2022/066696, filed Jun. 20, 2022, an application claiming the benefit of European Patent Application No. 21181210.2, filed Jun. 23, 2021, the contents of each of which are hereby incorporated by reference in their entirety.

FIELD OF THE INVENTION

The invention relates to manufacturing a leading-edge protection element, such as a cap for protecting a leading edge of a wind turbine blade.

BACKGROUND OF THE INVENTION

Wind is an increasingly popular clean source of renewable energy with no air or water pollution. When the wind blows, wind turbine blades capture energy, which is transformed to electrical power in a generator. Wind turbine blades are typically made of a fibre-reinforced polymer material and comprise a pressure side shell half and a suction side shell half. As wind turbines increase in size, so do blade lengths, often resulting in higher tip speeds. The higher speeds increase the risk of erosion of leading edges of the wind turbine blades due to the continued impact from for instance wind, rain, hail, and sand, which cause material to be removed from the blade surface, resulting in a rough surface that impacts the aerodynamic performance and the structural integrity of the blade adversely. Such erosive processes can affect the maximum rotational speed of the wind turbine blades, hence reducing the power output of the wind turbine. The negative effects are exacerbated in harsh environmental conditions, such as at remote offshore sites, mountain regions, and other challenging climates. Leading-edge erosion results in reduced annual energy production and increased need for maintenance and repairs. Protective devices are applied to the leading edge of wind turbine blades to reduce the need for maintenance and repairs.

It is desirable that the manufacturing of leading-edge protective devices is as efficient as possible. It is therefore an object of the present invention to provide an improved method for obtaining a fibre-reinforced composite product such as a cap for protecting a leading edge of a wind turbine blade.

SUMMARY OF THE INVENTION

In a first aspect, the invention provides a method for trimming a side portion of a pre-manufactured leading-edge protection element for protecting a leading edge of a wind turbine blade, the leading-edge protection element extending in a longitudinal direction between a first longitudinal end and a second longitudinal end, the leading-edge protection element comprising a first side portion and a second side portion, the first side portion, when mounted to the wind turbine blade, extending from the leading edge and along a part of a pressure side of the wind turbine blade, and the second side portion, when mounted to the wind turbine blade, extending from the leading edge and along a part of a suction side of the wind turbine blade, or vice versa. The method comprises:

providing a support structure;

providing a first cutting tool, preferably connected to the support structure;

arranging the leading-edge protection element on the support structure, fixating the leading-edge protection element to the support structure, and cutting along a predetermined cutting path, whereby the leading-edge protection element is trimmed to a predetermined length.

Embodiments of the first aspect allow more precise and efficient manufacturing of leading-edge protection products such as leading-edge caps. The invention provides for high product consistency, reducing the amount of additional modifications required for the product to meet specifications.

The first predetermined length is a transverse length in a direction transverse to the longitudinal direction of the leading-edge protection element.

In some embodiments, the first side portion is cut along the predetermined cutting path, such that the first side portion is trimmed to the first predetermined length, $L_1$.

In some embodiments, the second side portion is cut along a second predetermined cutting path, such that the second side portion is trimmed to a second predetermined length, $L_2$. The first cutting tool may be used to trim the second side portion, or a separate (second) cutting tool may be used. In some embodiments, two cutting tools are operated simultaneously. In some embodiments, the first cutting tool is operated starting from the first longitudinal end of the leading-edge protection element and the second cutting tool is operated starting from the second longitudinal end of the leading-edge protection element.

The first and second predetermined lengths $L_1$, and $L_2$. may, and typically do, vary in the longitudinal direction, reflecting that airfoil profile of wind turbine blades, including the airfoil width and the airfoil thickness, generally decrease from a shoulder 40 to a tip end 15, as illustrated in FIG. 3.

The leading-edge protection element may be pre-manufactured such that the leading-edge protection element after trimming extends along any desired portion of the leading edge of the wind turbine blade.

In some embodiments, fixating the leading-edge protection element to the support structure comprises fixating at least the first side portion of the leading-edge protection element or both the first side portion and the second side portion of the leading-edge protection element to the support structure.

In some embodiments, fixating the leading-edge protection element comprises clamping a part of the pre-manufactured leading edge protection element to the support structure using clamping means. The clamping means may include one or more clamps and may also include one or more devices, such as one or more boards, arranged to distribute the clamping effect of one or more of the clamps across the first flange. Boards can increase product portion consistency because the outcome of the trimming is less sensitive to the precise position of the clamps relative to the leading-edge protection element during trimming.

In some embodiments, the leading-edge protection element comprises a first flange, and fixating the leading-edge protection element comprises clamping the first flange to the support structure using clamping means. In some embodiments, fixating the leading-edge protection element to the support structure includes arranging a board such as to distribute across the first flange a force provided by one or more of the clamps, as also described above.

In some embodiments, the leading-edge protection element comprises a first flange as described above, and fixating the leading-edge protection element comprises arranging the first flange in contact with one or more suction supports on the support structure and providing suction in the one or more suction supports. The suction supports may for instance include a tabletop with openings connected to a vacuum pump or discrete pads with respective openings connected to a vacuum pump.

In some embodiments, the first cutting tool comprises a saw, such as a rotatable saw blade attached to a cutting tool motor.

In some embodiments, the first cutting tool is supported directly by the leading-edge protection element during cutting.

In some embodiments, the leading-edge protection element is an elongate structure having a convex side and a concave side, but the leading-edge protection element may have other shapes.

In some embodiments, the leading-edge protection element is a leading-edge cap for protecting a leading edge of a wind turbine blade.

The leading-edge protection element may be made for instance of fibre-reinforced composite material, polymer material, such as polyurethane polymer material, metal, thermoplastic material, ceramic material, epoxy-infused composite, or a combination of two or more thereof.

In some cases, the leading-edge protection element to be trimmed can be seen as comprising a product portion to be used and sacrificial portions connected to the product portion, where a first sacrificial portion of the sacrificial portions comprises the first side portion, and a second sacrificial portion of the sacrificial portions comprises the second side portion. Fixating the leading-edge protection element to the support structure may comprise fixating the first sacrificial portion to the support structure, and cutting along the first predetermined cutting path at least partially separates the first sacrificial portion from the product portion, trimming the first side portion to the desired predetermined length.

In some embodiments, the first sacrificial portion comprises a first flange, and fixating the first sacrificial portion comprises clamping the first flange to the support structure using clamping means. The clamping means may include one or more clamps and may also include one or more devices, such as one or more boards, arranged to distribute the clamping effect of one or more of the clamps across the first flange. Boards can increase product portion consistency because the outcome of the trimming is less sensitive to the precise position of the clamps relative to the first sacrificial portion during trimming. The advantageous effect of the board or boards is particularly important if the flange does not conform to the shape of the support structure, such as a planar tabletop.

In some embodiments, the first cutting tool comprises rolling means for rolling the first cutting tool so as to cut along the first predetermined path. Rolling means make the moving of the cutting tool easier, in part because it eliminates a sliding friction that may exist between the cutting tool and the leading-edge protection element (or a board arranged on a flange).

In some embodiments, a surface of the leading-edge protection element acts as a guiding fence for the first cutting tool during the moving of the first cutting tool. The guiding means on the cutting tool engage with the leading-edge protection element. Such an embodiment has a higher cutting tool stability during cutting, which results in further improved product consistency.

In some embodiments, the support structure comprises a support part that has a shape that conforms to an inner side of the leading edge protection element. For instance, in some embodiments, the support structure comprises one or more product portion supports that support the product portion during the moving of the first cutting tool during cutting. In case the leading-edge protection element is somewhat flexible, the support part can help dampen vibrations that occur during the trimming process. A product portion support that conforms to a shape of a product portion also has the advantage that the product portion is supported by the product portion support after trimming.

In some embodiments, the support part is reconfigurable to more easily allow support of leading-edge protection elements of different shapes.

In some embodiments, the method comprises the first cutting tool being guided by a guide system. The leading-edge protection element or a board supporting the first cutting tool may for instance have a groove that cooperates with a corresponding flange (or other suitable protrusion) on the first cutting tool. In other embodiments, the first cutting tool comprises a groove that cooperates with a flange (or other suitable protrusion) on the leading-edge protection element or on a board supporting the first cutting tool. The flange-groove parts may be configured with a guide system that prevents the first cutting tool from being easily removed during the cutting. For instance, the motor may be fitted with a dove tail portion that engages with a corresponding groove on the leading-edge protection element or a board supporting the first cutting tool. The dove tail and groove may for instance be engaged from an end of the groove by inserting the dove tail portion into the groove. Such a locking system may improve both safety and product consistency. Equivalent locking mechanisms may be used instead.

A second aspect of the invention provides a system for trimming a leading-edge protection element for a wind turbine blade, the leading-edge protection element comprising a first side portion and a second side portion, the first side portion, when mounted to the wind turbine blade, extending from the leading edge and along a part of a pressure side of the wind turbine blade, and the second side portion, when mounted to the wind turbine blade, extending from the leading edge and along a part of a suction side of the wind turbine blade, or vice versa. The system comprises:

a support structure for supporting the leading-edge protection element, fixating means for fixating the leading-edge protection element to the support structure, a first cutting tool for cutting along a predetermined cutting path, whereby the leading-edge protection element is trimmed to a predetermined length.

In some embodiments, the fixating means comprises clamping means and/or comprises one or more suction supports for fixating at least the first side portion by suction.

The considerations above in relation to the first aspect may be applicable to the second aspect as well. For instance, the fixating means may comprise clamping means and/or one or more suction supports, such as pads, for fixating the leading-edge protection element by suction. A position and/or a posture (e.g. angling) of each of the one or more of the suction supports may be adjustable.

As another example, in some embodiments, the first side portion is cut along the predetermined cutting path, such that the first side portion is trimmed to the first predetermined length, $L_1$.

As another example, in some embodiments, the second side portion is cut along a second predetermined cutting path, such that the second side portion is trimmed to a second predetermined length, $L_2$. The first cutting tool may be used to trim the second side portion, or a separate (second) cutting tool may be used. In some embodiments, two cutting tools are operated simultaneously. In some embodiments, the first cutting tool is operated starting from the first longitudinal end of the leading-edge protection element and the second cutting tool is operated starting from the second longitudinal end of the leading-edge protection element.

As another example, the first and second predetermined lengths $L_1$. and $L_2$. may, and typically do, vary in the longitudinal direction, reflecting that airfoil profile of wind turbine blades, including the airfoil width and the airfoil thickness, generally decrease from a shoulder 40 to a tip end 15, as illustrated in FIG. 3.

DETAILED DESCRIPTION OF SELECTED EMBODIMENTS

Embodiments of this disclosure will be described in more detail in the following with reference to the accompanying figures. The description and figures are not to be construed as limiting the scope of the claims to the illustrated embodiments.

Figure 1:
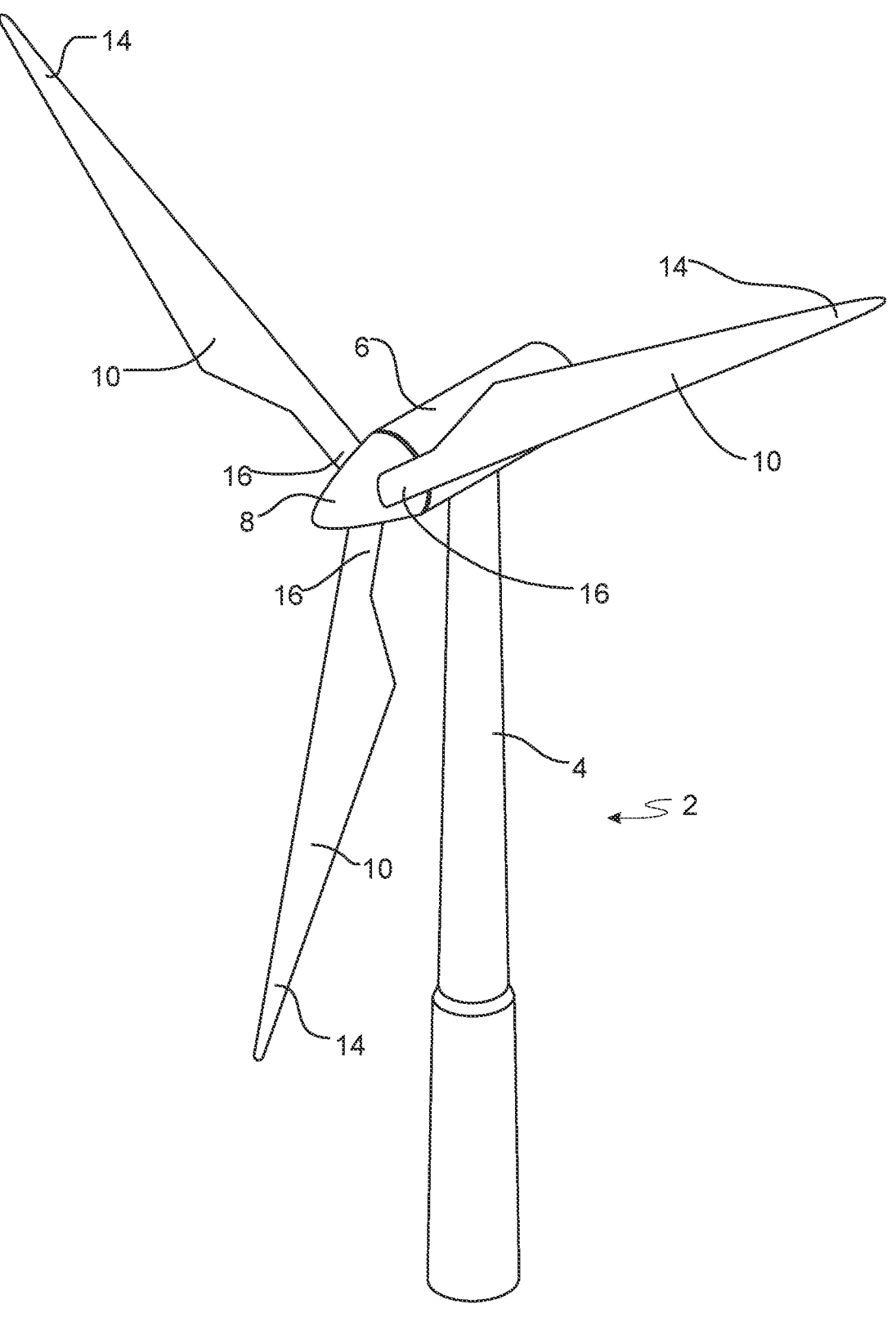
FIG. 1 is a schematic view of a wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a root end 16 nearest the hub and a blade tip 14 furthest from the hub 8.

Figure 2:
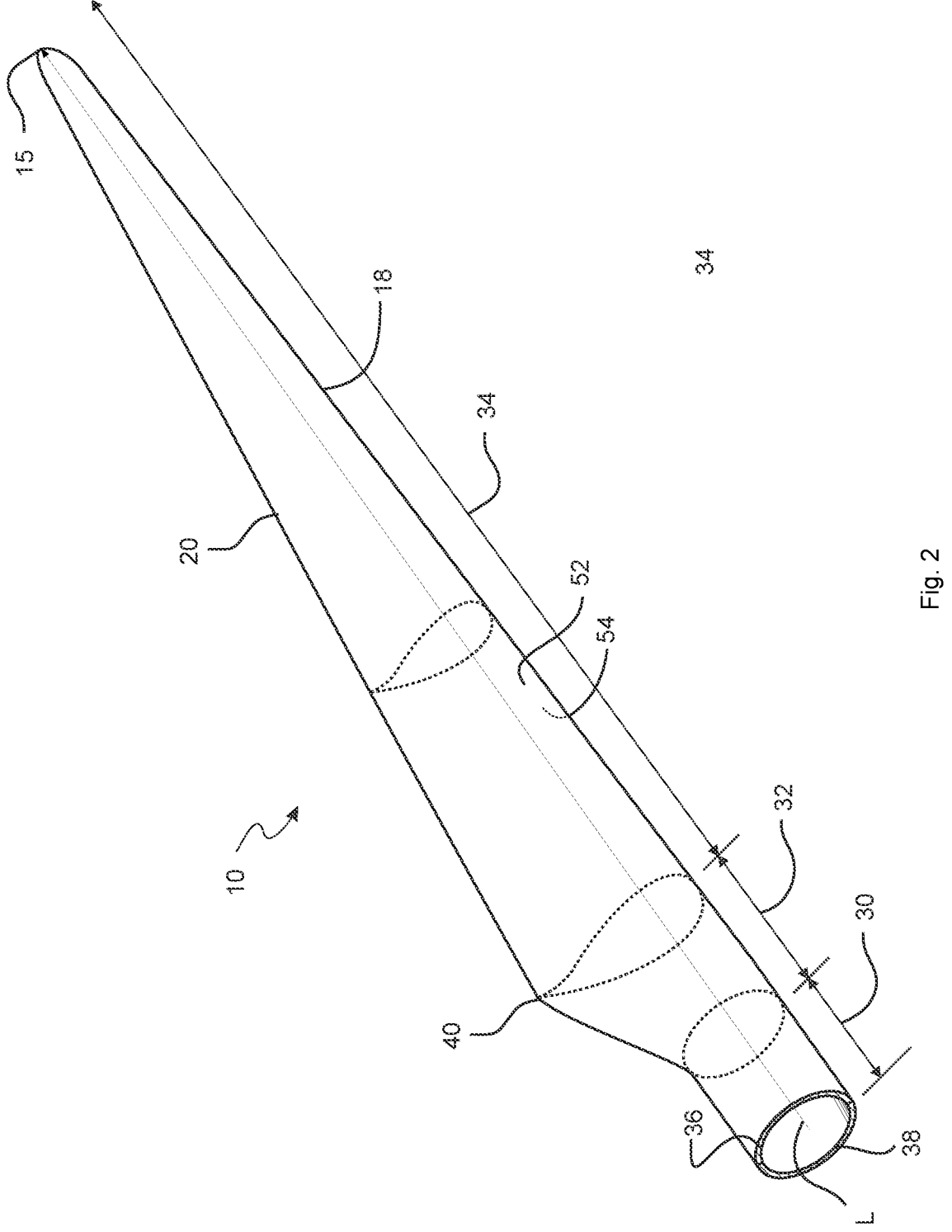
FIG. 2 is a schematic view of a wind turbine blade.

FIG. 2 shows a schematic view of an exemplary wind turbine blade 10. The wind turbine blade 10 has the shape of a conventional wind turbine blade with a root end and a tip end and comprises a root region 30 closest to the hub, a profiled or airfoil region 34 furthest away from the hub 8, and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18. The airfoil region 34, also called the profiled region, has an ideal or almost ideal blade shape with respect to generating lift, whereas the root region 30 due to structural considerations has a substantially circular or elliptical cross-section, which for instance makes it easier and safer to mount the blade 10 to the hub 8. The blade 10 has a pressure side 52 and a suction side 54, which, during use—i.e. during rotation of the hub 8—normally face towards the windward (or upwind) side and the leeward (or downwind) side, respectively. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord in the airfoil region 34 typically decreases with increasing distance r from the hub. A shoulder 40 of the blade 10 is defined as the position, where the blade 10 has its largest chord length. The shoulder 40 is typically provided at the boundary between the transition region 32 and the airfoil region 34.

The wind turbine blade 10 comprises a blade shell comprising two blade shell parts, a first blade shell part 24 and a second blade shell part 26, typically made of fibre-reinforced polymer. The first blade shell part 24 is typically a pressure side or upwind blade shell part. The second blade shell part 26 is typically a suction side or downwind blade shell part. The first blade shell part 24 and the second blade shell part 26 are attached to one another with adhesive, such as glue, along bond lines or glue joints 28 extending along the trailing edge 20 and the leading edge 18 of the blade 10. Typically, the root ends of the blade shell parts 24, 26 have a semi-circular or semi-oval outer cross-sectional shape.

Figure 3:
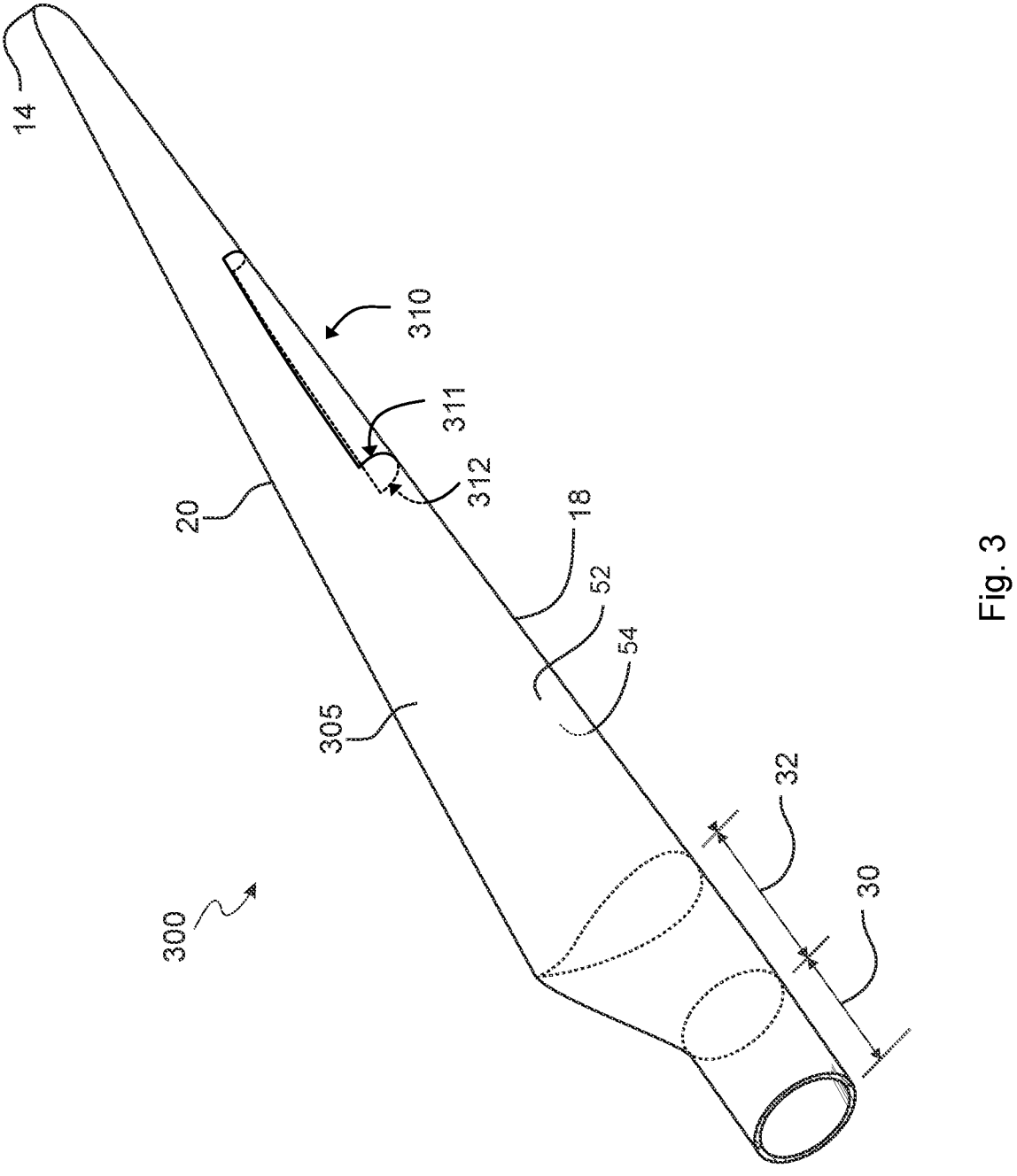
FIG. 3 is a schematic view of a wind turbine blade with a leading-edge cap.

Similar to FIG. 2, FIG. 3 schematically illustrates a wind turbine blade 300. The wind turbine blade 300 comprises a wind turbine blade part 305 similar to the wind turbine blade 10 shown in FIG. 2. The wind turbine blade 300 further comprises a protective cap 310 extending along a part of a leading edge 18 of the wind turbine blade 300. The protective cap is located near the tip end of the blade part 305. Like all other parts, it is important that the cap 310 be manufactured in an efficient way, which the trimming methods in accordance with embodiments of the invention contribute to.

FIG. 3 illustrates a leading-edge cap having a first side portion 311 that extends from the leading edge 18 and along a part of the pressure side 52 of the blade 300. Similarly, FIG. 3 illustrates a leading-edge cap second side portion 312 that extends from the leading edge 18 and along a part of the suction side 54 of the blade 300.

Figure 4:
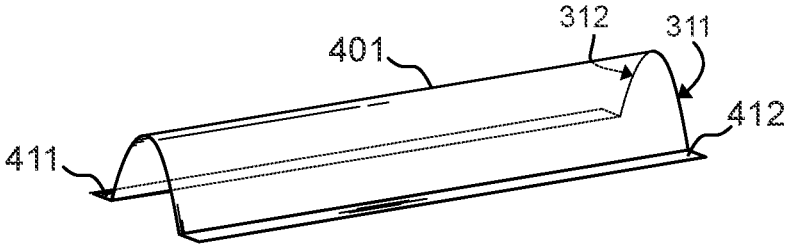
FIG. 4 is a schematic view of a leading-edge protection element to be trimmed.

FIG. 4 illustrates a pre-manufactured leading-edge protection element 401 that is an intermediate product for manufacturing a leading-edge cap, such as the cap 310 shown in FIG. 3. In the present example, the leading-edge protection element 401 has been manufactured in a mould, which has given the element 401 its shape. The leading-edge protection element 401 is an intermediate product having a product portion to be used—the cap 310—and sacrificial portions that will be discarded or used for another purpose if possible. The sacrificial portion or portions are those portions that are trimmed off the leading-edge protection element 401 to achieve the product portion 310, i.e. the cap 310 in this case. The product portion may be subjected to additional processing steps after being separated from the sacrificial portions. In FIG. 4, the reference 401 also points to a leading-edge protection element crest that defines the leading edge 18 when the cap 310 is mounted on the wind turbine blade 300, as illustrated in FIG. 3. FIG. 4 illustrates the first and second side portions 311, 312 extending from the crest 401. At this point in the process, the side portions 311, 312 are longer than on the final cap 310, but are trimmed in accordance with an embodiment of the invention as described below to achieve desired predetermined lengths $L_1$ and $L_2$ in the direction transverse to the crest. The leading-edge protection element (and crest) extends in a longitudinal direction from a first longitudinal end to a second longitudinal end.

In the present example, the leading-edge protection element 401 has an arcuate portion comprising the first and second side portions 311, 312 of the cap 310, and two flanges 411, 412 that are integrally formed with the first and second side portions 311, 312. The flanges may for instance result, when fibre material is arranged, in a mould and on edges of the mould and later resin-infused. During resin infusion, the fibre material on the mould edges may receive resin as well, resulting in an element 401 with flanges 411, 412.

Figure 5:
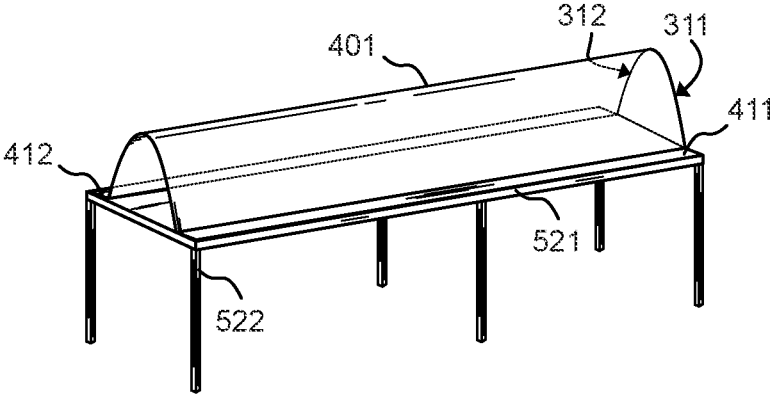
FIG. 5 is a schematic view of a leading-edge protection element arranged on a support structure.

In the present example, the leading-edge protection element 401 is subsequently arranged on a support, in this case a table-like support with a flat tabletop 521 and legs 522, as shown in FIG. 5. The flanges 411, 412 initially rest freely on the tabletop 521. In the present example, the flanges are planar and conform to the tabletop. The tabletop 521, or more generally the support structure, may instead or additionally be adapted to accommodate flanges that are not planar, for instance by having reconfigurable pads that can be reconfigured to support non-planar flanges.

Figure 6:
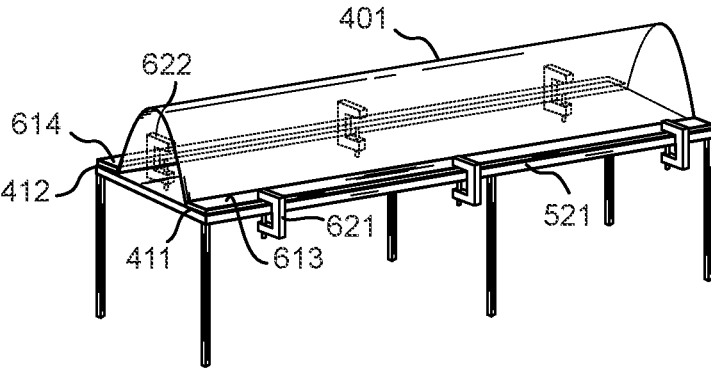
FIG. 6 is a schematic view of a leading-edge protection element clamped to a support structure.

In a subsequent step, the flanges 411, 412 are fixated to the tabletop 521 using clamps, as illustrated in FIG. 6. Flange 411 is clamped on one side of the tabletop using three clamps 621. Similarly, flange 412 is clamped on the other side of the tabletop using three clamps 622. In addition, this embodiment makes use of two intermediate boards 613, 614 arranged to hold down the flanges 411, 412 along the length of the leading-edge protection element 401. This ensures that two elements of the type 401 are held onto the support 521 in a consistent way even if the shape of the flanges deviate from planar or differ somewhat from one leading-edge protection element to another due to unavoidable minor process variations during manufacturing of the leading-edge protection elements. The boards 613, 614 thereby improve product consistency.

Figure 7:
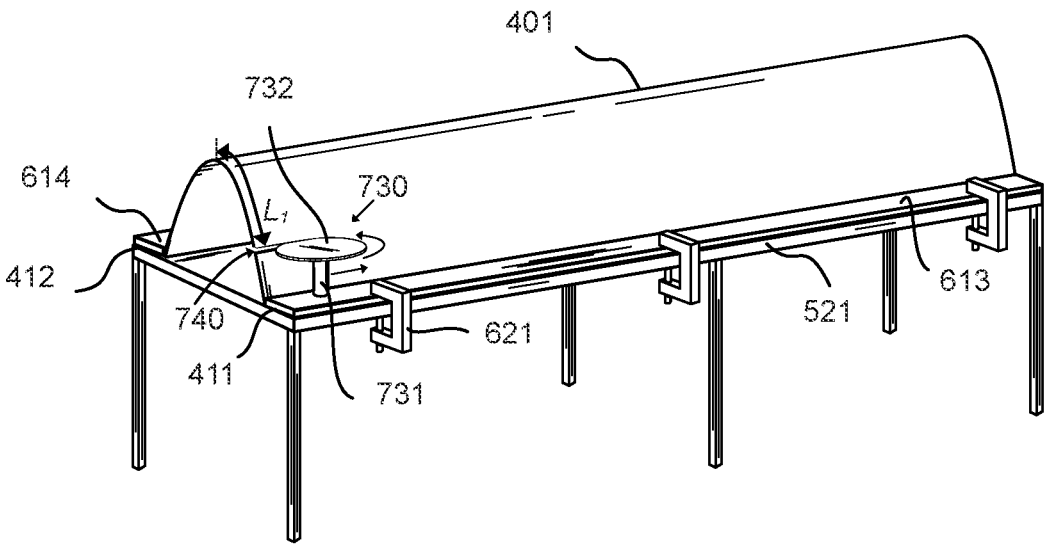
FIG. 7 is a schematic view of a process of separating a product portion from a sacrificial portion of a leading-edge protection element.

In a subsequent step, shown in FIG. 7, the flange 411 is separated from the rest of the leading-edge protection element 401 using an activated cutting tool 730. The cutting tool 730 comprises a rotating saw 732 connected to a motor 731. The saw 732 is engaged with the leading-edge protection element 401 and moved along a first predetermined path on the leading-edge protection element 401 as indicated with the straight arrow originating from the motor 731, thereby producing a separation as indicated by arrow 740. In the present example, the motor rests on the board 613, meaning it is indirectly, not directly, supported by a sacrificial portion, such as the flange 411. In some embodiments, boards 613, 614 are not used, and the motor 731 is arranged directly on a sacrificial portion, such as on the flange 411.

As illustrated in FIG. 7, the trimming provides the desired first predetermined length $L_1$ of the pressure side portion of the cap 310.

As also seen in this example, the cooperation between the cutting tool 730 and the board results in a cut having an even height along the leading-edge protection element 401, i.e. along the first predetermined path. It is clear to the skilled person in view of the present disclosure that the leading-edge protection element 401 can be formed in such a way that when the step shown in FIG. 7 is performed, i.e. the leading-edge protection element 401 is cut with a uniform height relative to the flange or board, the resulting product portion obtains the desired shape. In other words, the sacrificial portions are designed such that when the cutting takes place, the resulting product portion, such as a leading-edge cap for a wind turbine blade, achieves the desired shape. This means that the method is also suitable for a product portion having dimensions that change along an axis of the product portion, such as the lengths of the first and second side portions 311, 312. This is typically the case for a cap for a leading edge of a wind turbine blade. If the cap is designed to extend to, or substantially to, the relatively small tip region of the wind turbine blade, the present method may in some cases need to be supplemented by an alternative method to finish the trimming.

The method may comprise the cutting tool being guided by a guide system (not illustrated). The flange 411 itself or the board 613 may for instance have a groove that cooperates with a corresponding flange on the cutting tool 730. In other embodiments, the cutting tool comprises a groove that cooperates with a flange (or other suitable protrusion) on the flange 411 or on the board 613. The flange-groove parts may also be configured with a guide system that prevents the cutting tool 730 from being easily removed during the trimming. For instance, the motor 731 may be fitted with a dove tail portion that engages with a corresponding groove on the board 613. The dove tail and groove may be engaged from an end of the groove by inserting the dove tail portion into the groove, i.e. at the first or second longitudinal end of the leading-edge protection element 401. Such a locking system may improve safety and product portion consistency.

As indicated above, the cutting tool may be used to cut off a sacrificial portion either partly or entirely. In some cases, it is advantageous to perform part of the trimming process using another method, especially where the product has a more intricate shape. In some embodiments, the element 401 has been partly trimmed before a method in accordance with the present invention is used.

Figure 8:
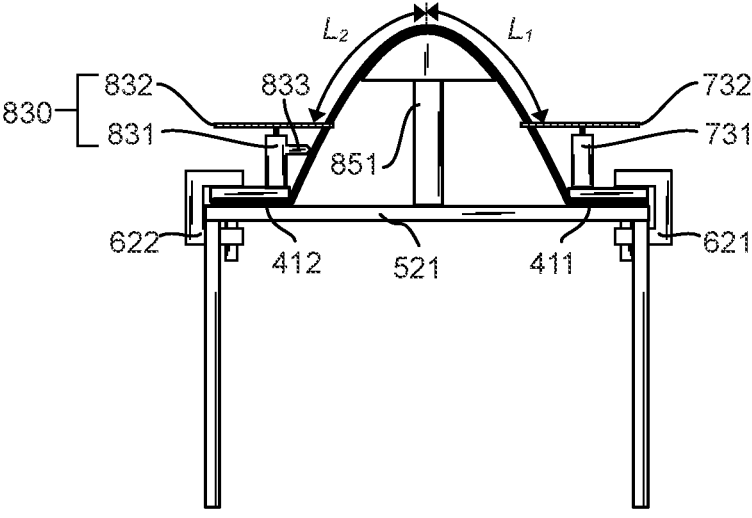
FIG. 8 is a schematic end view of a process of separating a product portion from a sacrificial portion of a leading-edge protection element.

FIG. 8 illustrates an end view corresponding to the first longitudinal end of the leading-edge protection element 401, showing the support tabletop 521 with the leading-edge protection element 401 arranged on it, the flanges 411, 412 clamped to the tabletop 521 using respective boards 613, 614 and clamps 621, 622 as described above. FIG. 8 also illustrates an additional cutting tool 830 comprising a saw 832 powered by a motor 831.

The additional cutting tool 830 may be used to cut off the sacrificial portion comprising flange 412, or the first cutting tool 730 may be used. In some embodiments, two cutting tools can be operated simultaneously. In some embodiments, one cutting tool is operated starting from the first longitudinal end of the leading-edge protection element 401 and the other cutting tool is operated starting from the second longitudinal end of the leading-edge protection element 401.

As illustrated in FIG. 8, the trimming provides the desired first and second predetermined lengths $L_1$ and $L_2$ of the pressure side portion 311 and the suction side portion 312 of the cap 310, respectively.

FIG. 8 further illustrates a product portion support 851. The product portion support 851 in this example conforms to the shape of the leading-edge protection element 401. In case the leading-edge protection element 401 is somewhat flexible, the product portion support 851 can help dampen vibrations arising during the trimming process. In some embodiments, the product portion support 851 is reconfigurable to more easily allow support of elements 401 of different shapes. Another advantage of the product portion support 851 is that the product portion 310 is supported by the product portion support 851 during and also after trimming. This makes it easier to handle the product portion 310, which may have lengths above 100 m and a weight that cannot be safely handled manually.

FIG. 8 also illustrates guiding means 833 on the cutting tool that engage with the leading-edge protection element 401. The leading-edge protection element 401 is used as a fence for the guiding means 833. This provides additional support for the cutting tool 830, increasing the stability of the cutting tool during cutting, in turn resulting in further improved product portion consistency.

Figure 9:
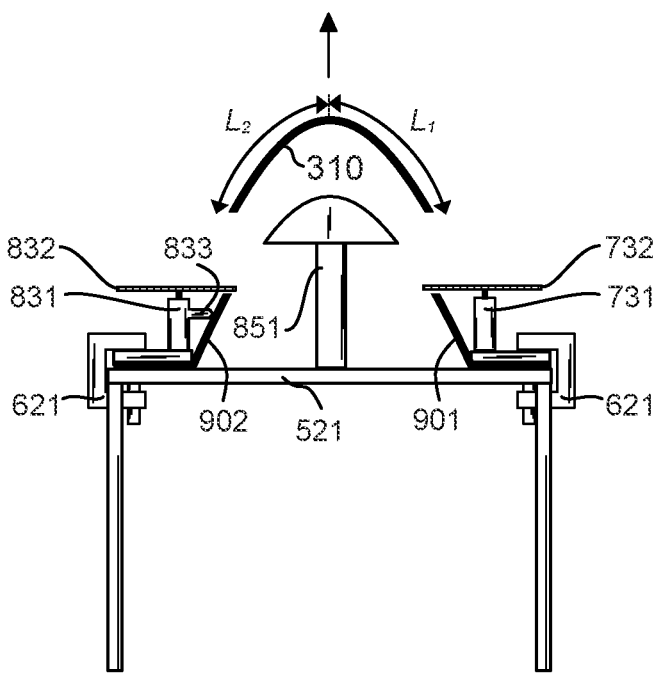
FIG. 9 illustrates a product portion separated from sacrificial portions of a leading-edge protection element.

FIG. 9 shows an end view similar to FIG. 8, but after the product portion 310 has been separated from the sacrificial portions, which are labelled 901 and 902 in FIG. 9. The sacrificial portions 901, 902 comprise the flanges 411, 412 used to fixate the leading-edge protection element 401 to the support 521. FIG. 9 shows how the product portion 310 can be removed by simple lifting from the product portion support 851 supporting it as shown in FIG. 8.

After trimming of the leading-edge protection element 401, thereby obtaining the product portion 310, the sacrificial portions 901, 902 can be removed, and another element 401 can be trimmed in accordance with an embodiment of the invention.

The product portion 310 obtained as described above is shown separately in FIG. 10. After suitable additional processing, the product portion is ready to be used. In the example above, the trimming of the leading-edge protection element 401 results in a leading-edge cap similar to the cap 310 shown in FIG. 3. After trimming and after performing any additional steps required, the cap 310 is attached to the wind turbine blade, resulting in the blade shown in FIG. 3. It is noted that for simplicity, the non-uniform cross-section of the cap 310 in FIG. 3 is not illustrated in FIGS. 4-11.

Figure 10:
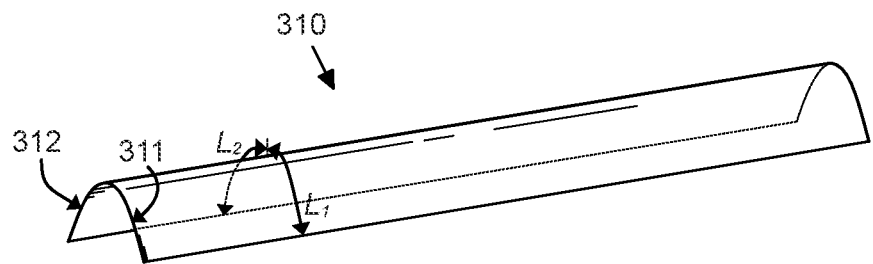
FIG. 10 illustrates a product portion obtained using an embodiment of the invention.

Similarly to FIGS. 8-9, FIG. 10 shows how the trimming provides the desired first and second predetermined lengths $L_1$ and $L_2$ of the pressure side portion 311 and the suction side portion 312 of the cap 310, respectively.

Figure 11:
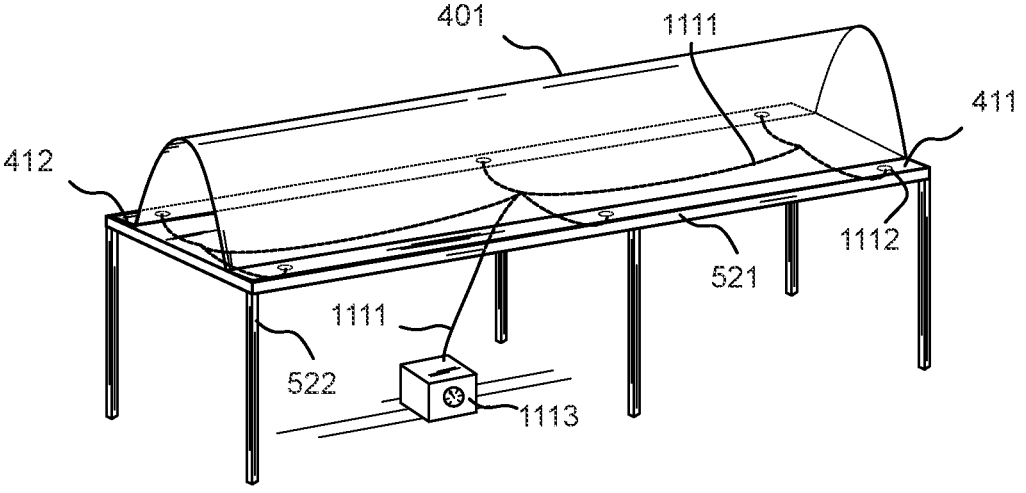
FIG. 11 is a schematic view showing alternative fixating means compared to FIG. 6.

FIG. 11 illustrates an alternative way of fixating the leading-edge protection element 401 to a support such as a tabletop 521. FIG. 11 schematically illustrates a number of suction openings 1112 connected to a vacuum pump 1113 via tubes 1111. Suction produced by the vacuum pump maintains the leading-edge protection element 401 fastened on the tabletop 521. The suction openings 1112 may be higher or lower in number and may have alternative shapes in order to provide suitable suction pressure to hold the leading-edge protection element 401 in place during trimming. If necessary, part of the leading-edge protection element 401, such as the flanges 411, 412, may be treated to ensure a vacuum-tight fit.

The leading-edge protection element 401 may alternatively be supported by pads rather than a flat surface, such as by adjustable pads, such as by pads that can provide suction. The pads are preferably adjustable with respect to position and/or posture (e.g. adjustable angling), the adjustable posture being implemented for instance using adjustable ball joints.

Various embodiments are set out in the following items:

1. A method for trimming a side portion of a pre-manufactured leading-edge protection element (401) for protecting a leading edge of a wind turbine blade, the leading-edge protection element extending in a longitudinal direction between a first longitudinal end and a second longitudinal end, the leading-edge protection element comprising a first side portion (311) and a second side portion (312), the first side portion, when mounted to the wind turbine blade, extending from the leading edge and along a part of a pressure side (52) of the wind turbine blade, and the second side portion, when mounted to the wind turbine blade, extending from the leading edge and along a part of a suction side (54) of the wind turbine blade, or vice versa, the method comprising the steps of:
providing a support structure (521, 522);
providing a first cutting tool (730), preferably connected to the support structure;
arranging the leading-edge protection element on the support structure,
fixating the leading-edge protection element to the support structure, and
cutting along a predetermined cutting path, whereby the leading-edge protection element is trimmed to a predetermined length.

2. A method in accordance with item 1, wherein at least the first side portion is cut along the predetermined cutting path, such that the first side portion is trimmed to a first predetermined length (L1).

3. A method in accordance with any of items 1-2, wherein the second side portion is cut along a second predetermined cutting path using the first cutting tool or a second cutting tool, such that the second side portion is trimmed to a second predetermined length (L2).

4. A method in accordance with any of the preceding items, wherein the first predetermined length varies in the longitudinal direction of the leading-edge protection element.

5. A method in accordance with any of the preceding items, wherein fixating the leading-edge protection element to the support structure comprises fixating at least the first side portion (311) of the leading-edge protection element or both the first side portion and the second side portion of the leading-edge protection element to the support structure.

6. A method in accordance with any of the preceding items, wherein the leading-edge protection element is made of fibre-reinforced composite material or a polymer material, such as a polyurethane polymer material.

7. A method in accordance with any of the preceding items, wherein the leading-edge protection element comprises a product portion (310) to be used and one or more sacrificial portions (901, 902) connected to the product portion, and fixating the leading-edge protection element to the support structure comprises fixating a first sacrificial portion (901) of the one or more sacrificial portions to a support structure (521, 522), and wherein cutting along the first predetermined cutting path at least partially separates (740) the first sacrificial portion from the product portion.

8. A method in accordance with any of the preceding items, wherein the leading-edge protection element is an elongate structure (310) having a convex side and a concave side.

9. A method in accordance with any of the preceding items, wherein the leading-edge protection element is a leading-edge cap (310) for protecting the leading edge of the wind turbine blade.

10. A method in accordance with any of the preceding items, wherein fixating the leading-edge protection element comprises clamping a part of the pre-manufactured leading edge protection element to the support structure.

11. A method in accordance with any of the preceding items, wherein the leading-edge protection element comprises a first flange (411), and fixating the leading-edge protection element comprises clamping the first flange to the support structure using clamping means (613, 621, 614, 622).

12. A method in accordance with item 11, wherein fixating the leading-edge protection element to the support structure includes arranging a board such as to distribute across the first flange a force provided by one or more of the clamps.

13. A method in accordance with any of items 1-10, wherein the leading-edge protection element comprises a first flange (411), and wherein fixating the leading-edge protection element comprises arranging the first flange in contact with one or more suction supports (1112) on the support structure and providing suction (1111, 1113) in the one or more suction supports (1112).

14. A method in accordance with any of the preceding items, wherein a surface of the leading-edge protection element acts as a guiding fence for the first cutting tool during the cutting.

15. A method in accordance with any of the preceding items, wherein the support structure comprises a support part that has a shape that conforms to an inner side of the leading edge protection element.

16. A method in accordance with item 7, wherein the leading-edge protection element further comprises a second sacrificial portion (902), the fixating further comprising fixating the second sacrificial portion (902) to the support structure.

17. A method in accordance with any of the preceding items, wherein the first cutting tool comprises a saw, such as a rotatable saw blade (732) attached to a cutting tool motor (731).

18. A method in accordance with any of the preceding items, wherein the first cutting tool is supported directly by the leading-edge protection element during cutting.

19. A method in accordance with any of the preceding items, wherein the first cutting tool is guided by a guiding system during the cutting.

20. A system for trimming a leading-edge protection element (401) for a wind turbine blade, the leading-edge protection element comprising a first side portion (311) and a second side portion (312), the first side portion, when mounted to the wind turbine blade, extending from the leading edge and along a part of a pressure side (52) of the wind turbine blade, and the second side portion, when mounted to the wind turbine blade, extending from the leading edge and along a part of a suction side (54) of the wind turbine blade, or vice versa, the system comprising:

a support structure (521, 522) for supporting the leading-edge protection element, fixating means (613, 614, 621, 622, 1111, 1112, 1113) for fixating the leading-edge protection element to the support structure, a first cutting tool (730) for cutting along a predetermined cutting path, whereby the leading-edge protection element is trimmed to a first predetermined length.

21. A system in accordance with item 20, wherein the fixating means comprises clamping means (613, 614, 621, 622) and/or comprises one or more suction supports (1112) for fixating at least the first side portion by suction (1111, 1113).

LIST OF REFERENCE NUMERALS

2: wind turbine
4: tower
6: nacelle
8: hub
10: blades
14: blade tip
15: tip end
16: blade root
18: leading edge
20 trailing edge
30: root region
32: transition region
34: airfoil region
36: pressure side shell part
38: suction side shell part
40: blade shoulder
52 pressure side
54 suction side
300 wind turbine blade
305 wind turbine blade part
310 leading-edge cap
311 first side portion
312 second side portion
401 leading-edge protection element
411, 412 flange
521 tabletop/support structure
522 legs/support structure
613, 614 board
621, 622 clamps
730 first cutting tool
731 motor
732 saw
740 separation
830 second cutting tool
831 motor
832 saw
833 guiding means
851 product portion support
901, 902 sacrificial portions
1111 suction tube
1112 suction support, suction opening
1113 vacuum pump

The invention claimed is:

1. A method for trimming a side portion of a pre-manufactured leading-edge protection element (401) for protecting a leading edge of a wind turbine blade, the leading-edge protection element extending in a longitudinal direction between a first longitudinal end and a second longitudinal end, the leading-edge protection element comprising a first side portion (311) and a second side portion (312), the first side portion, when mounted to the wind turbine blade, extending from the leading edge and along a part of a pressure side (52) of the wind turbine blade, and the second side portion, when mounted to the wind turbine blade, extending from the leading edge and along a part of a suction side (54) of the wind turbine blade, or vice versa, the method comprising the steps of:

providing a support structure (521, 522);

providing a first cutting tool (730);

arranging the leading-edge protection element on the support structure;

fixating the leading-edge protection element to the support structure; and cutting along a predetermined cutting path, whereby the leading-edge protection element is trimmed to a predetermined length.

2. The method in accordance with claim 1, wherein at least the first side portion is cut along the predetermined cutting path, such that the first side portion is trimmed to a first predetermined length (L1).

3. The method in accordance with claim 1, wherein the second side portion is cut along a second predetermined cutting path using the first cutting tool or a second cutting tool, such that the second side portion is trimmed to a second predetermined length (L2).

4. The method in accordance with claim 1, wherein the first predetermined length varies in the longitudinal direction of the leading-edge protection element.

5. The method in accordance with claim 1, wherein fixating the leading-edge protection element to the support structure comprises fixating at least the first side portion (311) of the leading-edge protection element or both the first side portion and the second side portion of the leading-edge protection element to the support structure.

6. The method in accordance with claim 1, wherein the leading-edge protection element is made of fibre-reinforced composite material or a polymer material, such as a polyurethane polymer material.

7. The method in accordance with claim 1, wherein the leading-edge protection element comprises a product portion (310) to be used and one or more sacrificial portions (901, 902) connected to the product portion, and fixating the leading-edge protection element to the support structure comprises fixating a first sacrificial portion (901) of the one or more sacrificial portions to a support structure (521, 522), and wherein cutting along the first predetermined cutting path at least partially separates (740) the first sacrificial portion from the product portion.

8. The method in accordance with claim 1, wherein the leading-edge protection element is a leading-edge cap (310) for protecting the leading edge of the wind turbine blade.

9. The method in accordance with claim 1, wherein the leading-edge protection element comprises a first flange (411), and fixating the leading-edge protection element comprises clamping the first flange to the support structure using clamping means (613, 621, 614, 622).

10. The method in accordance with claim 9, wherein fixating the leading-edge protection element to the support structure includes arranging a board such as to distribute across the first flange a force provided by one or more of the clamps.

11. The method in accordance with claim 1, wherein the leading-edge protection element comprises a first flange (411), and wherein fixating the leading-edge protection element comprises arranging the first flange in contact with one or more suction supports (1112) on the support structure and providing suction (1111, 1113) in the one or more suction supports (1112).

12. The method in accordance with claim 1, wherein a surface of the leading-edge protection element acts as a guiding fence for the first cutting tool during the cutting.

13. The method in accordance with claim 1, wherein the support structure comprises a support part that has a shape that conforms to an inner side of the leading edge protection element.

14. The method in accordance with claim 1, wherein the first cutting tool comprises a saw, such as a rotatable saw blade (732) attached to a cutting tool motor (731).

15. A system for trimming a leading-edge protection element (401) for a wind turbine blade, the leading-edge protection element extending in a longitudinal direction between a first longitudinal end and a second longitudinal end and comprising a first side portion (311) and a second side portion (312), the first side portion, when mounted to the wind turbine blade, extending from the leading edge and along a part of a pressure side (52) of the wind turbine blade, and the second side portion, when mounted to the wind turbine blade, extending from the leading edge and along a part of a suction side (54) of the wind turbine blade, or vice versa, the system comprising:

a support structure (521, 522) for supporting the leading-edge protection element;

fixating means (613, 614, 621, 622, 1111, 1112, 1113) for fixating the leading-edge protection element to the support structure; and a first cutting tool (730) configured for cutting along a predetermined cutting path along the longitudinal direction of the leading-edge protection element, whereby the leading-edge protection element is trimmed to first predetermined lengths in the longitudinal direction of the leading-edge protection element.

16. The method in accordance with claim 1, wherein the first cutting tool (730) is connected to the support structure.

17. A system for trimming a leading-edge protection element (401) for a wind turbine blade, the leading-edge protection element, wherein the leading-edge element is formed as an elongate structure having a convex side and a concave side and comprising a first side portion (311) and a second side portion (312), the first side portion, when mounted to the wind turbine blade, extending from the leading edge and along a part of a pressure side (52) of the wind turbine blade, and the second side portion, when mounted to the wind turbine blade, extending from the leading edge and along a part of a suction side (54) of the wind turbine blade, or vice versa, the system comprising:

a support structure (521, 522) for supporting a part of the concave side of the leading-edge protection element, wherein the fixating means comprises clamping means and/or comprises one or more suction supports for fixating at least the first side portion by suction;

fixating means (613, 614, 621, 622, 1111, 1112, 1113) for fixating the leading-edge protection element to the support structure; and a first cutting tool (730) for cutting along a predetermined cutting path, whereby the leading-edge protection element is trimmed to a first predetermined length.

* * * * *